United States Patent
Abts et al.

(10) Patent No.: US 10,048,663 B2
(45) Date of Patent: Aug. 14, 2018

(54) METHOD TO MAINTAIN BASE SPEED OF AN IRRIGATION SYSTEM OVER TIME

(71) Applicant: Precision Circle, LLC, Denver, CO (US)

(72) Inventors: Gerald L. Abts, Denver, CO (US); Kevin J. Abts, Aurora, CO (US)

(73) Assignee: Precision Circle, LLC, Denver, CO (US)

( * ) Notice: Subject to any disclaimer, the term of this patent is extended or adjusted under 35 U.S.C. 154(b) by 297 days.

(21) Appl. No.: 14/841,385

(22) Filed: Aug. 31, 2015

(65) Prior Publication Data
US 2017/0055469 A1    Mar. 2, 2017

(51) Int. Cl.
G05D 11/00 (2006.01)
G05B 15/02 (2006.01)
A01G 25/09 (2006.01)
G01S 19/14 (2010.01)

(52) U.S. Cl.
CPC ........... *G05B 15/02* (2013.01); *A01G 25/092* (2013.01); *G01S 19/14* (2013.01); *G05B 2219/2625* (2013.01)

(58) Field of Classification Search
CPC ............ G05B 15/02; G05B 2219/2625; A01G 25/092; G01S 19/14
USPC ....................................................... 700/284
See application file for complete search history.

(56) References Cited

U.S. PATENT DOCUMENTS

| | | |
|---|---|---|
| 4,580,731 A | 4/1986 | Kegel et al. |
| 5,255,857 A | 10/1993 | Hunt |
| 6,007,004 A | 12/1999 | Unruh |
| 6,337,971 B1 | 1/2002 | Abts |
| 6,755,362 B2 | 6/2004 | Krieger et al. |
| 6,820,828 B1 | 11/2004 | Greenwalt |
| 7,384,008 B1 | 6/2008 | Malsam |
| 7,584,053 B2 | 9/2009 | Abts |
| 8,849,468 B2 | 9/2014 | Abts et al. |
| 2002/0008167 A1 | 1/2002 | Haberland et al. |
| 2003/0066912 A1 | 4/2003 | Krieger et al. |
| 2003/0229432 A1* | 12/2003 | Ho ............... A01D 41/1274 701/50 |
| 2004/0093912 A1 | 5/2004 | Krieger et al. |
| 2006/0027677 A1 | 2/2006 | Abts |
| 2007/0267524 A1 | 11/2007 | Mack |
| 2010/0032493 A1* | 2/2010 | Abts .................... A01G 25/092 239/11 |
| 2012/0053776 A1 | 3/2012 | Malsam et al. |
| 2013/0018553 A1 | 1/2013 | Malsam |
| 2013/0211717 A1* | 8/2013 | Abts ..................... A01G 25/16 701/485 |

(Continued)

*Primary Examiner* — Robert Cassity
(74) *Attorney, Agent, or Firm* — Dorr, Carson & Birney PC

(57) ABSTRACT

A method for controlling operation of a self-propelled irrigation system compensates for differences in expected wind drift and evaporative losses for time periods over the course of an irrigation cycle. Speed modifier values are determined for selected time periods to modify the base speed for the pivot arm assembly based on the corresponding expected wind drift and evaporative losses, with offsetting speed modifier values to modify the speed of the pivot arm assembly for other time periods, so that the period of time for completing an irrigation cycle remains unchanged. The pivot arm assembly is then controlled to move at the corresponding modified speed for each time period.

15 Claims, 13 Drawing Sheets

(56) References Cited

U.S. PATENT DOCUMENTS

2013/0253752 A1 9/2013 Grabow
2014/0225747 A1 8/2014 Abts

* cited by examiner

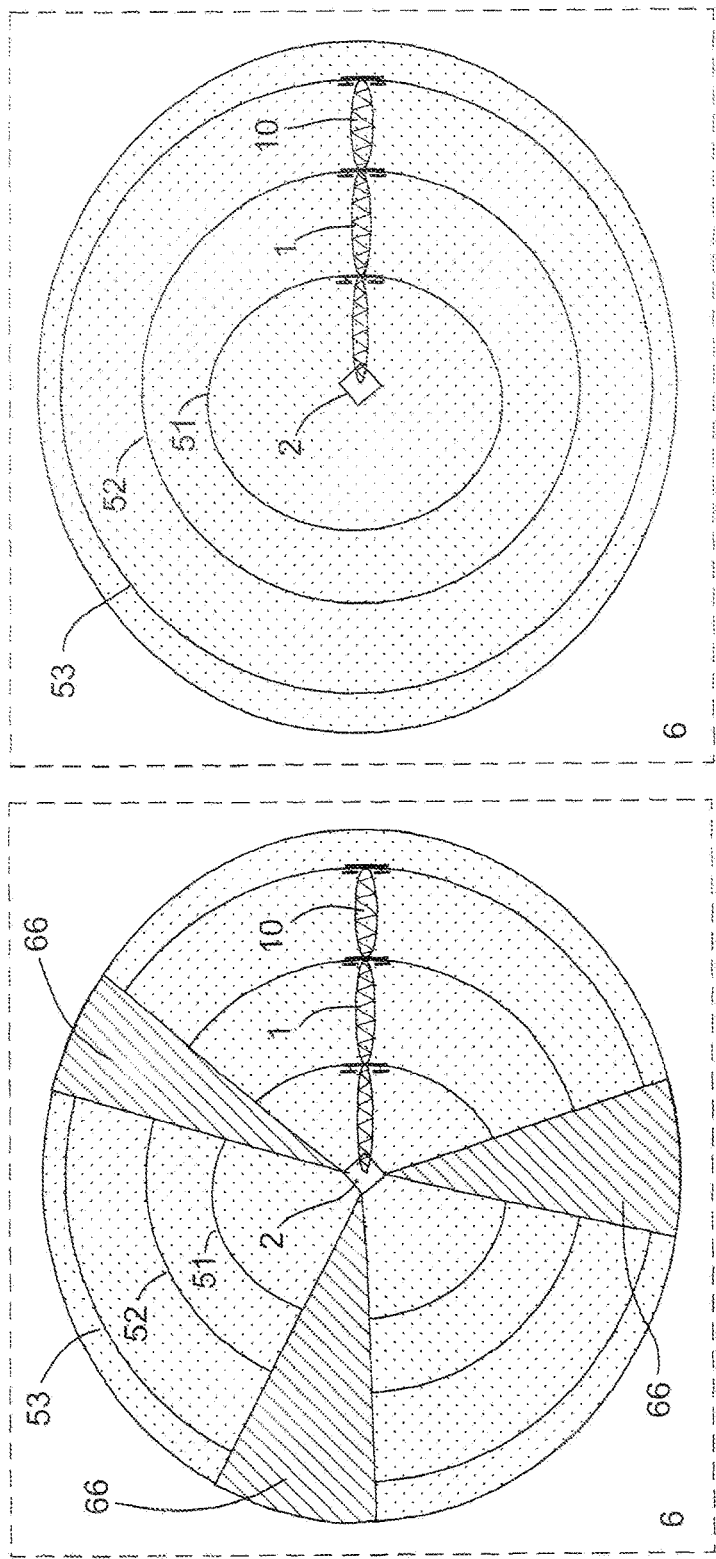

GROSS TO NET INCHES APPLIED - TABLE 49
*(DATA FOR CHART IN FIG. 3C)*

| Consecutive Time Periods | Local Time of Day | Gross Inches Applied | Net Inches Available To Crop |
|---|---|---|---|
| 59 | 60 | 63 | 66 (Adjusted For WDEL) |
| 1 | 12:00 AM | 1.00 | 0.95 |
| 2 | 1:00 AM | 1.00 | 0.95 |
| 3 | 2:00 AM | 1.00 | 0.95 |
| 4 | 3:00 AM | 1.00 | 0.95 |
| 5 | 4:00 AM | 1.00 | 0.95 |
| 6 | 5:00 AM | 1.00 | 0.95 |
| 7 | 6:00 AM | 1.00 | 0.95 |
| 8 | 7:00 AM | 1.00 | 0.95 |
| 9 | 8:00 AM | 1.00 | 0.95 |
| 10 | 9:00 AM | 1.00 | 0.95 |
| 11 | 10:00 AM | 1.00 | 0.95 |
| 12 | 11:00 AM | 1.00 | 0.90 |
| 13 | 12:00 PM | 1.00 | 0.85 |
| 14 | 1:00 PM | 1.00 | 0.80 |
| 15 | 2:00 PM | 1.00 | 0.75 |
| 16 | 3:00 PM | 1.00 | 0.75 |
| 17 | 4:00 AM | 1.00 | 0.75 |
| 18 | 5:00 PM | 1.00 | 0.75 |
| 19 | 6:00 PM | 1.00 | 0.75 |
| 20 | 7:00 PM | 1.00 | 0.80 |
| 21 | 8:00 PM | 1.00 | 0.85 |
| 22 | 9:00 PM | 1.00 | 0.90 |
| 23 | 10:00 PM | 1.00 | 0.95 |
| 24 | 11:00 PM | 1.00 | 0.95 |

*Fig.5*

DAY/NIGHT MODIFIER TABLE 48

Assumptions: Center Pivot Irrigation System 1 Speed Timer-Setting 5 at 10% to Apply 1.0-Inches of Water to a Field 6 Every 72-Hours

| Consecutive Time Periods 59 A | Local Time of Day 60 B | Day/Night Speed Modifier Values 61 C | D | Base Percent Speed Timer-Setting 3,5 E | F | Modified Speeds 64 G (C*E) | Gross Inches Applied 63 H | Modified Inches Applied 65 I H-(G-E)/E |
|---|---|---|---|---|---|---|---|---|
| 1 | 12:00 AM | 1.14 | X | 10.0% | = | 11.4% | 1.00 | 0.86 |
| 2 | 1:00 AM | 1.14 | X | 10.0% | = | 11.4% | 1.00 | 0.86 |
| 3 | 2:00 AM | 1.15 | X | 10.0% | = | 11.5% | 1.00 | 0.85 |
| 4 | 3:00 AM | 1.15 | X | 10.0% | = | 11.5% | 1.00 | 0.85 |
| 5 | 4:00 AM | 1.15 | X | 10.0% | = | 11.5% | 1.00 | 0.85 |
| 6 | 5:00 AM | 1.15 | X | 10.0% | = | 11.5% | 1.00 | 0.85 |
| 7 | 6:00 AM | 1.12 | X | 10.0% | = | 11.2% | 1.00 | 0.88 |
| 8 | 7:00 AM | 1.08 | X | 10.0% | = | 10.8% | 1.00 | 0.92 |
| 9 | 8:00 AM | 1.04 | X | 10.0% | = | 10.4% | 1.00 | 0.96 |
| 10 | 9:00 AM | 1.00 | ● | 10.0% | = | 10.0% | 1.00 | 1.00 |
| 11 | 10:00 AM | 0.95 | ● | 10.0% | = | 9.5% | 1.00 | 1.05 |
| 12 | 11:00 AM | 0.90 | ● | 10.0% | = | 9.0% | 1.00 | 1.10 |
| 13 | 12:00 PM | 0.85 | ● | 10.0% | = | 8.5% | 1.00 | 1.15 |
| 14 | 1:00 PM | 0.80 | ● | 10.0% | = | 8.0% | 1.00 | 1.20 |
| ● | ● | ● | ● | ● | ● | ● | ● | ● |
| 24 | 11:00 PM | 1.14 | X | 10.0% | = | 11.4% | 1.00 | 0.86 |
| 24-Hour Average: | | 1.00 | | 10.0% | | 10.0% | 1.00 | 1.00 |

Fig. 6

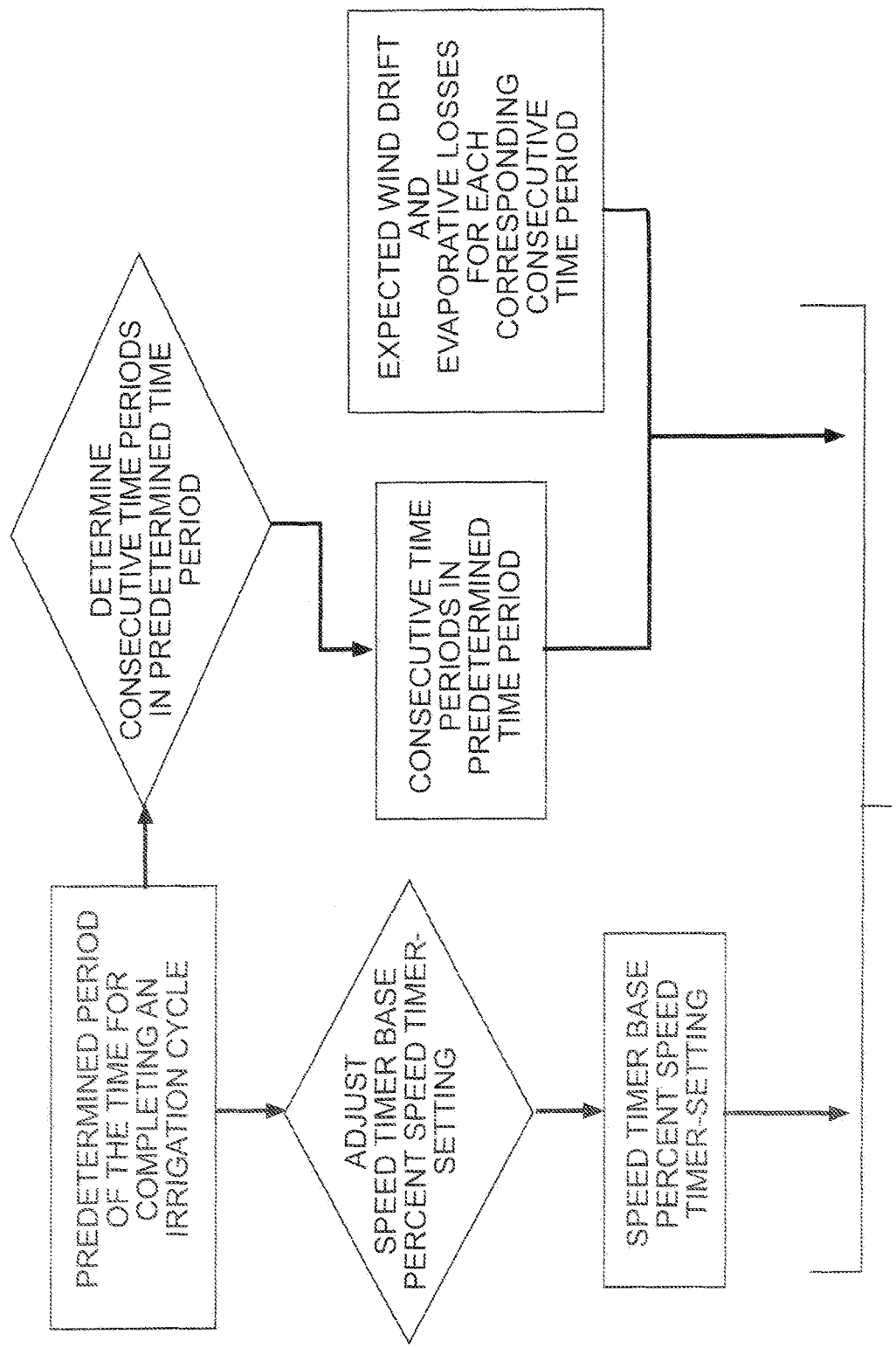

METHOD TO MAINTAIN BASE SPEED OF AN IRRIGATION SYSTEM OVER TIME

BACKGROUND OF THE INVENTION

Field of the Invention

The present invention relates generally to the field of control systems for self-propelled mechanized irrigation systems, primarily center pivot irrigation systems. More specifically, the present invention discloses a control method for irrigation systems that substantially increases irrigation efficiency by improving net water uniformity.

Statement of the Problem

Net water uniformity may be defined as the amount of irrigation water available to the crop as compared to the gross amount of water applied to an irrigated area by the center pivot irrigation system within a given cycle period. The difference between gross and net amounts of applied irrigation water are the water lost to the crop due to runoff, deep percolation (i.e., watering below the crop root zone), and water lost to the crop due to the effects of wind drift and evaporative losses (or "WDEL").

Irrigators are generally aware of the effects of W DEL that occur during changing environmental conditions throughout the day and night. Irrigators generally understand that center pivot irrigation is most efficient at night due to calmer wind conditions, lower temperatures, and higher relative humidity.

Irrigation efficiency may simply be expressed as the percentage of total applied irrigation water that is available to the growing crop. Generally, center pivot irrigation systems are designed and operated to achieve an average irrigation efficiency of 80% to 95%, meaning 80% to 95% of applied irrigation water may be made available to the crop.

Two variables that may affect irrigation efficiency are uniformity of application (same amount of water to all irrigated surfaces) and preciseness of application (water applied does not move or run off after being applied). Uniformity of water application is normally designed into the center pivot irrigation system by manufacturers and others. Delivery rates of water to the irrigated area by center pivot irrigation systems within a given cycle period are designed and adjusted to match the dominant soil texture (particle coarseness affecting water intake rates and water holding capacity) and slope conditions (slopes causing runoff from higher elevations to lower elevations before water can be absorbed by the soil). These two variables (uniformity and preciseness of water application) are generally not adjusted in response to hour-by-hour changes in environmental conditions such as WDEL.

Center pivot irrigation systems may take several days to make a single rotation (application of water) about a circular field, applying water at a desired rate expressed in acre inches (e.g., 1.0 inches). Normally, growing crops consume water at a rate that may require the center pivot irrigation system to be run continuously, day and night.

The roving center pivot arm assembly's speed over the ground is typically controlled by varying the duration in seconds of time that the outermost electric-drive motor is powered on during a fixed start and stop cycle time duration, typically one-minute. Conventionally, a speed timer device may be utilized to set and control the speed of the roving center pivot arm assembly of a center pivot irrigation system. For example, assuming a one-minute speed timer, a 20% speed timer-setting would provide power to the outermost electric-drive motor for an on-time duration of 12-seconds, followed by an off-time duration of 48-seconds out of each recurring, one-minute start and stop cycle.

Furthermore, said speed timer is typically set at a speed to result in a uniform application of irrigation water to the whole field, without consideration of the time of day. In operation, the speed timer simply cycles an outermost electric-drive motor on-and-off over an elapsed cycle time of one-minute. Optional speed timers have been provided for cycle times of 30-seconds, two-minutes, three-minutes, etc. But, the one minute speed timer has been the industry standard since the inception of the electric center irrigation system.

In practice, WDEL dynamically affects the efficiency of the irrigation process throughout all hours of the day. If the temperature, humidity and wind were constant throughout all hours of the day, at a set speed for a center pivot irrigation system, a uniform application of irrigation water to the irrigated area within a given cycle period would result, i.e., no areas of the field would have available to the crop a different net amount of applied irrigation water. However, WDEL conditions are not constant throughout the day. Rather, WDEL conditions are dynamic and reasonably predictable throughout the continuous day and night irrigation process.

Irrigators generally understand and accept that nighttime irrigation is more efficient than daytime irrigation. It is the reason that municipal water systems often restrict lawn watering to nighttime and early morning hours.

Irrigators also generally understand and accept that operation of center pivot irrigation systems should be configured to result in rotation times for multiples of 24-hour irrigation cycles plus or minus twelve hours. Such twelve hour "offset" rotation times of 36-hours, 60-hours, 84-hours, etc., may even out the effects of different net irrigation efficiencies due to the effects of WDEL at various hours of each day. If rotation times were not offset (e.g., by 12-hours) and instead, rotation times were set to one or more 24-hour irrigation cycles such as 24-hours, 48-hours, 72-hours, etc., the effects of WDEL would repeatedly affect the same area of the field, such area of the field being repeatedly irrigated at the same time of the day.

For example, assume an irrigation cycle is set to make a 24-hour rotation starting at 12:00 noon and to repeat the 24-hour rotations continuously for several weeks. This may result in the roving center pivot arm assembly always watering the same given area of the field between noon and 3:00 pm. Similarly, the roving center pivot arm assembly would always water a second given area of the field between 12:00 am and 3:00 am each day.

Due to the effects of WDEL, the noon to 3:00 pm area of the field (e.g., an area of the field making up a pie shape from 45 degrees to 90 degrees of the circular center pivot field) would receive relatively less net irrigation water than the midnight to 3:00 am area of the field (e.g., an area of the field making up a pie-shaped sector from 180 degrees to 225 degrees). After several rotations, the noon to 3:00 pm, under watered area (i.e., the 45 degree to 90 degree pie-shaped area) would display a visible "spoke" showing relative crop stress as compared to the relatively over watered midnight to 3:00 am pie-shaped area of the field (i.e., the 180 degree to 225 degree pie-shaped area).

To avoid such visible stress on crops evidenced by "spoking", irrigators generally add or subtract a 12-hour offset to their irrigation scheduling so the relative over and under watered of areas of the field (due to the effects of WDEL) are averaged out over several rotations. Using the previous example with a 12-hour offset, the pie-shaped area watered between noon and 3:00 pm would be moved by 180 degrees for every other rotation. This technique generally mitigates visible spoking in pie-shaped areas of the field.

Adding or subtracting a 12-hour offset to the multiples of 24-hour irrigation cycles making up a single rotation may avoid spoking. However, such a practice may have other effects on irrigation efficiency. For example, assume a field requires 0.70 inches of water to avoid crop stress. Assume further that, in an example, a rotation time of 48-hours would result in the application of 0.70 inches. If the irrigator was disposed to avoid spoking, he may be inclined to set the rotation time in this example to 48+12 hours (the offset) or 60-hours. This would result in a water application of 0.875 inches, not the required 0.70 inches. In effect, the field may receive more irrigation water than needed and the efficiency of the irrigation process may be reduced, all in an effort to avoid spoking.

In a second example, assume the irrigator chose to set the rotation time to 36-hours (48-12 hours) to avoid spoking. This may result in crop stress due to under-watering. Reducing the required 0.70 inches to 0.525 inches (48-hour rotation time speeded up to a 36-hour rotation time) may avoiding spoking, but may also cause crop stress due to under-watering.

Solution to the Problem

The present invention relates to self-propelled mechanized irrigation systems, primarily center pivot irrigation systems, and more particularly pertains to methods that substantially increase irrigation efficiency by improving net water uniformity by using methods that: (1) adjust center pivot irrigation system speeds of travel over the ground in order to offset the effects of changing wind drift and evaporative losses (WDEL) throughout the day and night; and (2) maintain distance of rotational movement over the ground of the roving center pivot arm assembly of a center pivot irrigation system within a given period of time for completing an irrigation cycle (e.g., 24-hours) as increases and decreases in the speed of the roving center pivot arm assembly are prescribed by the methodology of the present invention to offset the effects of WDEL without disruption to the irrigator's scheduled period of time for completing a distance of travel for an irrigation cycle. Thus, the present method negates the need for an offset, for example, 12-hours, to avoid spoking, while at the same time maintaining optimum irrigation efficiency and rotation time schedules.

SUMMARY OF THE INVENTION

This invention provides a method of modifying an irrigation control system by changing the speed of travel of the roving center pivot arm assembly based on time of day in order to offset the irrigation inefficiencies resulting from climatological changes that occur throughout every day (e.g., WDEL). The climatological data can be derived in real-time from local climate sensors, from local weather forecast data, and from local, historical climate data suitable for forecasting climatological variations each day of a growing season, for example, hour-by-hour, for a given geographical region.

Normal operation of a center pivot irrigation system requires an irrigator to select a speed for the roving center pivot arm assembly of the center pivot irrigation system. This speed is typically set using a conventional speed timer located in a main panel that may be mounted at the center point of the center pivot irrigation system. The speed timer is conventionally a one-minute timer controlling the outermost electric-drive motor on-and-off for a set number of seconds, respectively, during each recurring one-minute cycle.

In one embodiment of the present invention, a table of speed modifier values are factored against the base percent speed timer-setting of the speed timer of a center pivot irrigation system. The speed modifier values when factored against a base percent speed timer-setting, modify (e.g., hourly), the base percent speed timer-setting that otherwise controls the speed of the roving center pivot arm assembly. Such modifications to a base percent speed timer-setting may compensate for differences in irrigation efficiency that dynamically change due to predictable or measured climatological changes (e.g., WDEL) that occur throughout each day for a given geographical region. Such speed modifier values, applied to a base percent speed timer-setting simply increase or decrease the application depth of water by changing the speed of movement over the ground of the roving center pivot arm assembly of the center pivot irrigation system. The speed modifier values, factored against the base percent speed timer-setting, may periodically increase or decrease the application depth (e.g., once an hour) to compensate for the changes in irrigation efficiency that occur throughout a given day in a given geographic region due to dynamically changing climatological conditions (e.g., WDEL).

The present invention assumes the use of a microprocessor board that includes a conventional GPS receiver or other suitable means of maintaining a current time of day. A conventional GPS receiver may be configured to provide Greenwich Mean Time (GMT) and latitude and longitude coordinates that may be used to establish the location of a center pivot irrigation system, and, thereby, establish the offset hours of local time compared to GMT. Using the current date and the local time of day and a stored table of speed modifier values, a microprocessor of the present invention may process and output consecutive time period (e.g., hourly) modifications to the speed timer base percent speed timer-setting that otherwise controls the speed of the roving center pivot arm assembly.

The present invention provides a method for modifying the speed timer base percent speed timer-setting that controls the speed of the roving center pivot arm assembly of the center pivot irrigation system over time. It is important to note that the aggregate of the plurality of speed modifier values, for each time period, applied to the speed timer base percent speed timer-setting, for example hourly, over a 24-hour irrigation cycle, are configured to not cause a change in the average speed or distance of travel of the roving center pivot arm assembly of the center pivot irrigation system during a 24-hour period of time. In other words, the distance traveled by the roving center pivot arm assembly in any 24-hour irrigation cycle using the methods of the present invention may be the same as the distance traveled by the roving center pivot arm assembly resulting from the base percent speed timer-setting without using the methods of the present invention. For the present invention, daytime speeds of movement are generally slowed and nighttime speeds of movement are inversely and proportionately speeded up in order to maintain the total distance of travel, in a given 24-hour day irrigation cycle, to be the same for the base percent rate speed with and without modifications to the base percent speed timer-setting.

The modified speeds as embodied by the present invention may result in significant improvements to overall irrigation efficiency on any center pivot irrigation system. Application of speed modifier values to the base percent speed timer-setting generally decrease speed, to increase application depth of irrigation water, during the hottest and windiest times of the 24-hour irrigation cycle. To equally offset such speed modifications output by the microprocessor board during daytime hours, the methods of the present invention may increase speed during nighttime hours, to decrease application depth of water during the coolest and calmest times of the 24-hour irrigation cycle. If the plurality of these speed modifier values applied to the base percent speed timer-setting between daytime and nighttime hours are not properly offset, the distance of travel in a given 24-hour irrigation cycle, using methods of the present invention, will not coincide with the distance of travel as predicted by the base percent speed timer-setting without application of said speed modifier values. Such a disruption to the irrigator's irrigation schedule may be problematic to the process of effectively managing timely irrigations.

Since application of the present method does not change the total distance of travel of the roving center pivot arm assembly in a given 24-hour irrigation cycle, the improvements to overall irrigation efficiency may be realized without disruption to the irrigator's irrigation schedule.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3A is a pictorial diagram illustrating movement of a conventional center pivot irrigation system in a circular field, using prior art, with the roving center pivot arm assembly moving at a constant speed, day and night, providing repetitive 72-hour rotations, with the resulting spoking effect of crop stress visible in slashed patterned areas repeatedly watered in daytime hours of the field.

FIG. 3B is a pictorial diagram illustrating movement of a conventional center pivot irrigation system in a circular field, using methods of the present invention, with the roving center pivot arm assembly moving at modified speeds, between day and night watering, providing repetitive 72-hour rotations, without the effects of visible spoking of the field.

FIG. 5 is a table of data for the illustrating the hourly effects of WDEL on gross inches applied for a 24-hour irrigation cycle, i.e., a 24-hour period of time.

FIG. 6 is a Day/Night Modifier Table of the present invention illustrating consecutive time periods, local times of day, speed modifier values, a base percent speed timer-setting, modified speeds, gross inches applied, and modified inches applied.

FIGS. 9A and 9B are a flow diagram of the process used by the present invention as put forth in claim 12.

DETAILED DESCRIPTION OF THE INVENTION

Figure 1:
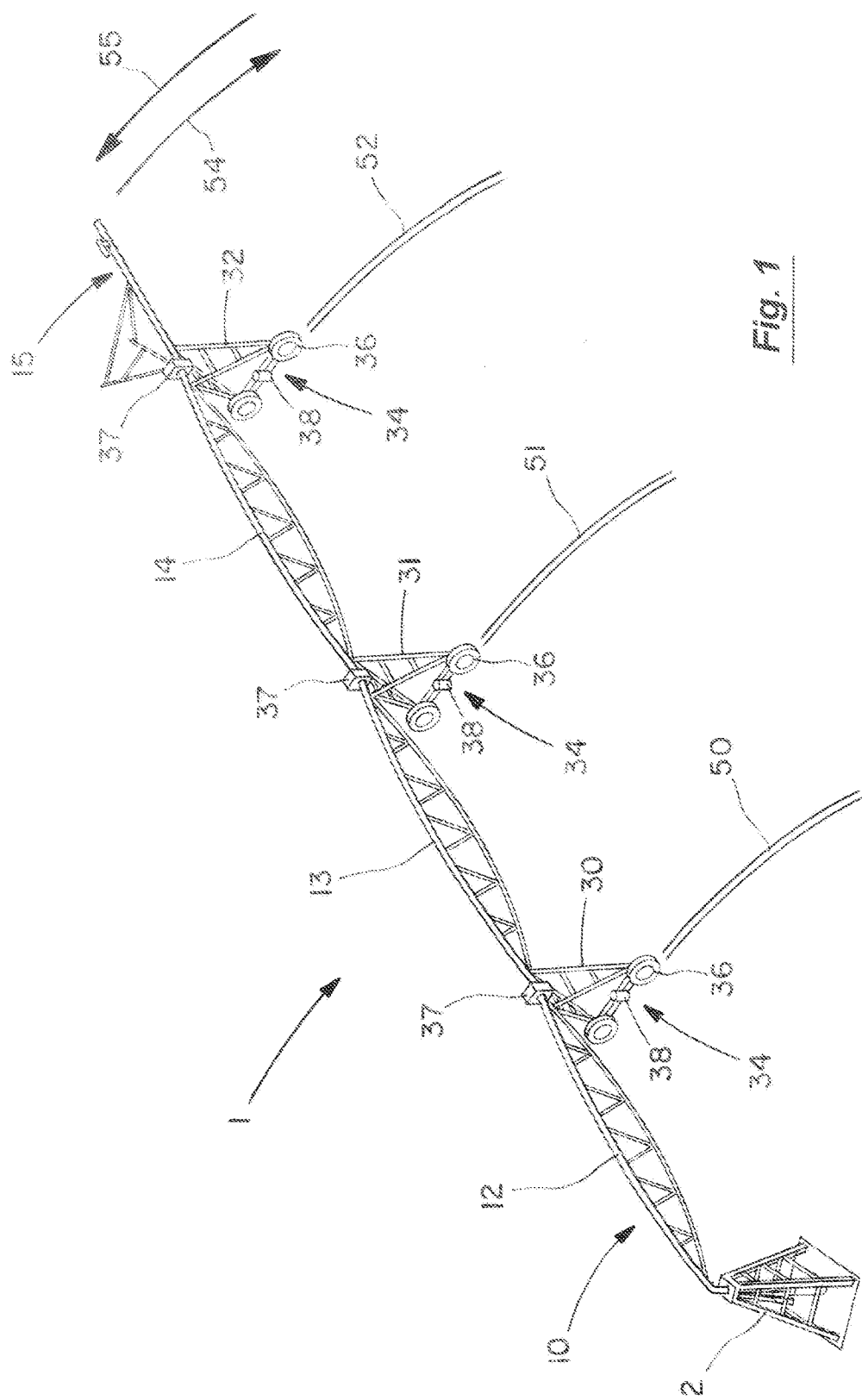
FIG. 1 illustrates a roving center pivot arm assembly with intermediate and outermost drive tower structures with electric-drive motors and wheels, and span movement in either a forward or reverse movement direction.

Overview.

Irrigation systems, such as center pivot irrigation systems, generally include a speed timer device to set the speed of an outermost drive tower (last span) by cycling a corresponding span motor on-and-off. A speed timer may be a mechanical device that controls an electrical circuit on-and-off over a period of time, for example one minute; or, the pivot speed may be controlled locally or remotely using a solid-state device with a similar on-and-off cycle function controlling an outermost span motor on-and-off to result in a set speed.

Conventionally, the set speed for the outermost drive tower is controlled by the speed timer base percent speed timer-setting and is typically not varied based on a time of day. Rather, the speed is generally kept constant (based on the speed timer base percent speed timer-setting) and not varied by time of day. The remaining intermediate drive towers are in turn controlled on-and-off by an alignment system (not shown). The alignment system on intermediate drive towers is actuated by the relative movement of adjacent outer drive tower.

Irrigation efficiency may be affected by changes in climactic conditions that occur throughout the day and night as temperatures, humidity, and wind conditions change. With a fixed speed of the roving center pivot arm assembly of the center pivot irrigation system, day and night, and a fixed rate of water flow, the resulting water application (gross inches applied) is generally more effective during nighttime hours than in daytime hours. Higher temperatures, lower humidity, and higher wind speeds during the daytime hours, as compared to nighttime hours, result in additional wind drift and evaporative losses (WDEL) affecting the efficiency of gross inches applied to a crop.

To compensate for the measurable and predictable changes in climactic conditions (e.g., WDEL) that occur during the continuous day and night irrigation operation, irrigators generally set their irrigation passes (rotations) to be completed in multiples of 24-hour irrigation cycles, plus or minus an offset of about 12-hours. This practice of adding or subtracting a 12-hour offset causes the daytime watered areas (pie-shaped sectors) of a field to be watered at nighttime in alternate 24+ or − 12-hour irrigation cycles, and vice-versa for the nighttime watered areas of the field. These practices by irrigators are generally employed to avoid relative crop stress that becomes visible as a "spoked", pie-shaped area of the field, resulting if the same area of the field (a pie-shaped sector) is always being watered during the least efficient irrigation time (e.g., daytime).

To eliminate the visible spoking of pie-shaped sectors of their fields, irrigators typically use a speed timer base percent speed timer-setting that may result in a roving center pivot arm assembly rotation time of an even number of days (24-hour periods) plus or minus about 12-hours.

In turn, such practices may cause irrigators to set the speed of the roving center pivot arm assembly to be slightly faster or slower than optimum for the water application needed by a growing crop. For example, if the irrigator needs to apply 1.0 inch of water to the field to optimally meet crop water requirements, such water application (1-inch per pass) may require the rotation time for each 1-inch application to be 72-hours (one continuous 72-hour irrigation cycle per rotation). If the 72-hour speed for a single rotation were to continue for four rotations (twelve consecutive days of operation), e.g., to apply 4-inches of water, visible spoking may occur. For the daytime watering of the field, the roving center pivot arm assembly of the center pivot irrigation system may always be in the same pie-shaped sectors of the field and such sectors may be relatively under watered due to the daytime effects of WDEL on irrigation efficiency. Similarly, for the nighttime watering of the field, the roving center pivot arm assembly of the center pivot irrigation system may always be in the same pie-shaped sectors of the field and such sectors may be more completely irrigated due to the diminished effects of WDEL on irrigation efficiency during nighttime hours. These irrigation efficiency differences affect net inches applied (water available to the crop) between daytime and nighttime hours due to the relative effects of WDEL and may be the cause visible spoking.

The present invention discloses means to modify the speed of the roving center pivot arm assembly of the center pivot irrigation system throughout each 24-hour irrigation cycle so as to compensate for changes in irrigation efficiency that may be caused by the dynamic effects of WDEL over any 24-hour time period.

Prior Art.

FIG. 1 illustrates a center pivot irrigation system 1 in accordance with an embodiment of the prior art. The center pivot irrigation system 1 described herein may also be referred to as a self-propelled irrigation system. Other self-propelled irrigation systems may include a linear move irrigation system (not shown), a lateral move irrigation system (not shown), or the like.

FIG. 1 illustrates an embodiment of the prior art wherein the irrigation system is a center pivot irrigation system 1. As shown, the center pivot irrigation system 1 may include a center pivot point structure 2, a roving center pivot arm assembly 10 coupled (e.g., connected) to the center pivot point structure 2, such roving center pivot arm assembly 10 including spans 12, 13, 14, supported by tower structures 30, 31, 32 with span motors 38, wheels 36 propelling fixed-speed drive assemblies 34 that include fixed-speed drive controllers 37, and with an end boom 15.

FIG. 3A is a diagram of an irrigation field 6 with center pivot point 2, center pivot irrigation system 1, and roving center pivot arm assembly 10 positioned at about 90 degrees. The rotation of the roving center pivot arm assembly 10 creates wheel tracks 51, 52, 53 in either a forward movement direction 54 or a reverse movement direction 55 (FIG. 1).

FIG. 3A also illustrates three examples in the prior art of spoking 66, as indicated by the slashed sectors. Such an example of visible spoking in a sector occurs once each 24-hour period (during the consecutive time periods for the hottest and windiest times of each day) with three such 24-hour periods occurring in a 72-hour rotation.

Figure 3C:
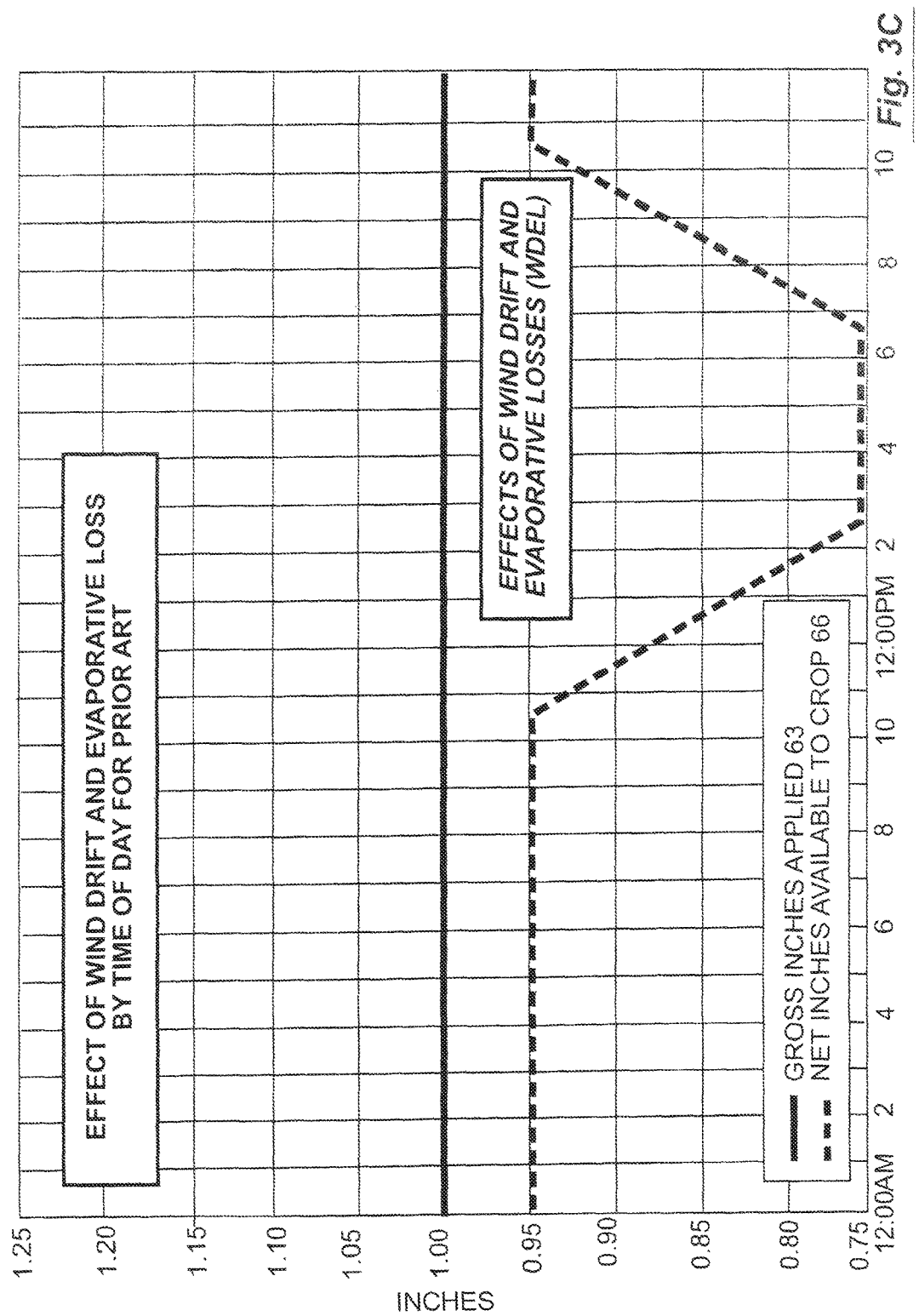
FIG. 3C is a chart illustrating for the prior art the effects of wind drift and evaporative losses during a typical 24-hour irrigation cycle.

FIG. 3C is a chart illustrating the effects of WDEL on a gross inches applied 63 of 1-inch, resulting in net inches available to crop 66 over a 24-hour period. The data for the chart illustrated in FIG. 3C is detailed in FIG. 5, by Table 49. The net inches available to the crop 66 is derived by applying the effects of WDEL to the gross inches applied 63. Irrigation research published by universities and others has documented the effect of WDEL on irrigation efficiency, hour-by-hour, and such data is readily available to irrigators and others for application to the methods of the present invention.

Figure 2B:
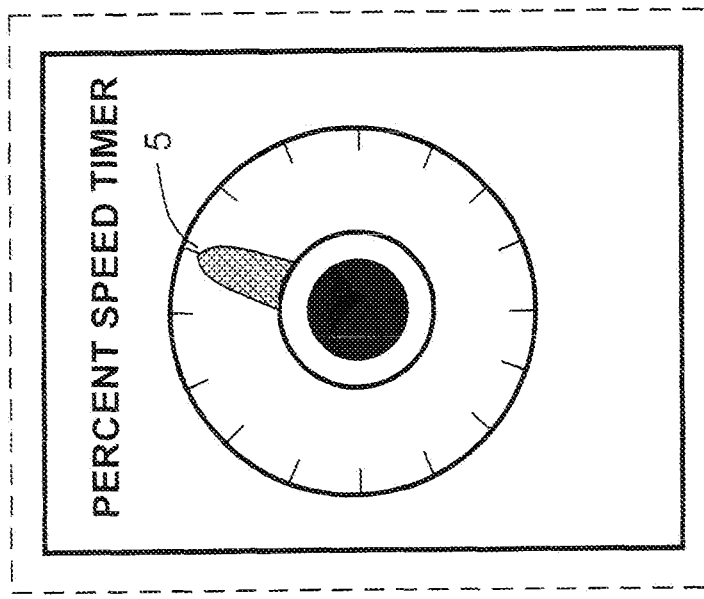
FIG. 2B illustrates a speed timer with a dial and with a graduated scale of 0.0% to 100% with the dial set to 10% as an example.
Figure 2A:
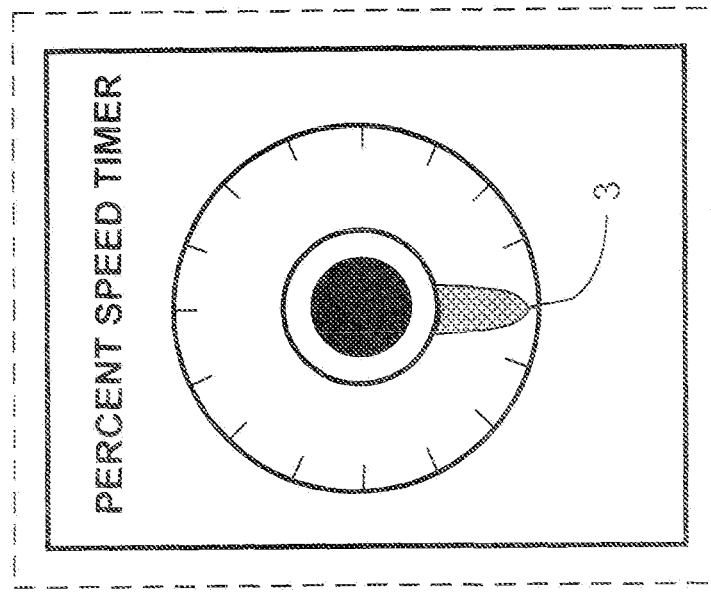
FIG. 2A illustrates a speed timer with a dial and with a graduated scale of 0.0% to 100% with the dial set to 50% as an example.
Figure 4A:
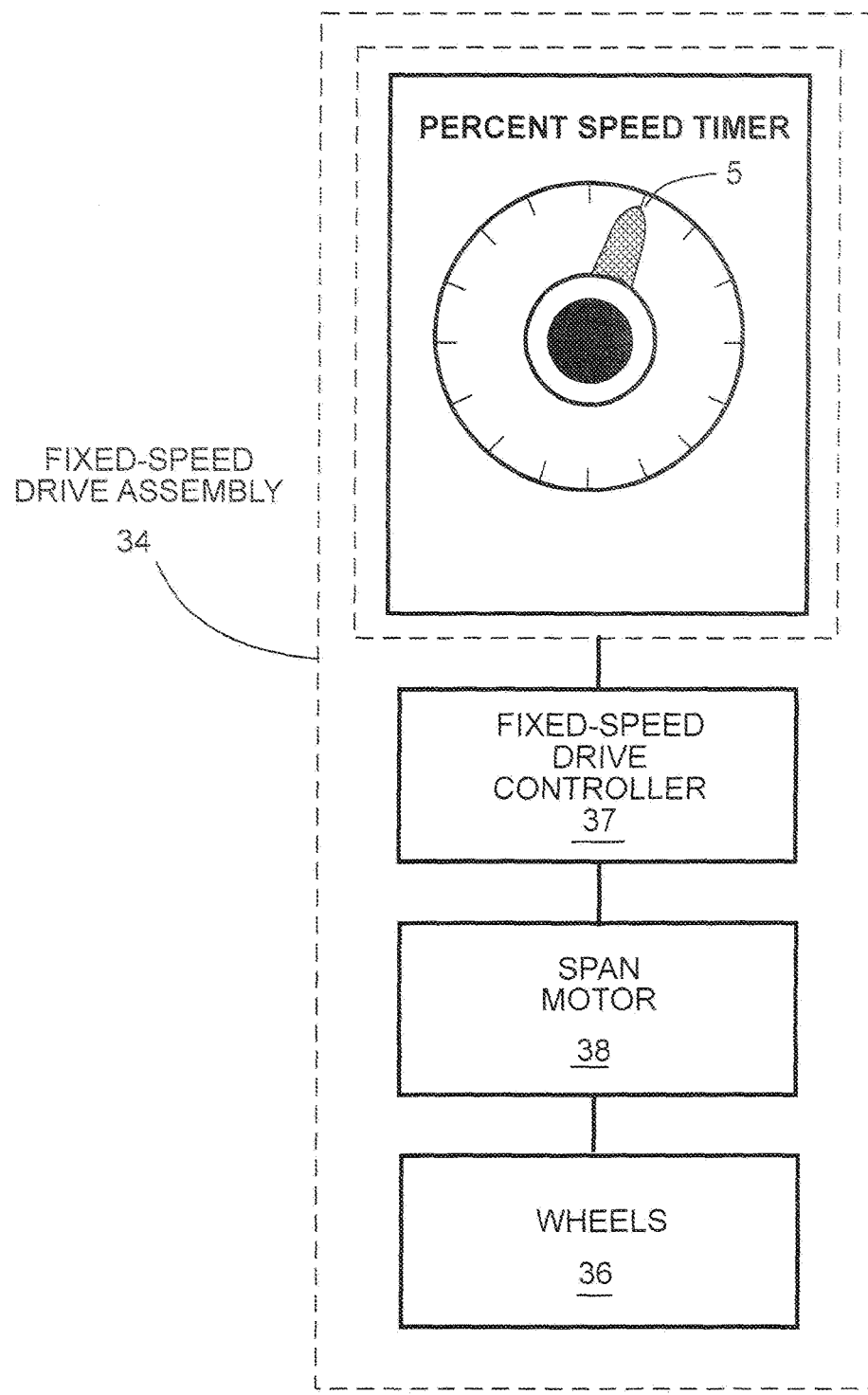
FIG. 4A is an illustration of the fixed-speed drive controller of the prior art.

FIG. 4A illustrates the components of a fixed-speed drive assembly 34, typical of the outermost drive tower 32, of a conventional irrigation system 1 (FIG. 1) of the prior art. Referring to FIGS. 1 and 4A, the fixed-speed drive assembly 34 of outermost drive tower 32 may include a fixed-speed drive controller 37, a span motor 38, and wheels 36. The fixed-speed drive controller 37 of the outermost drive tower 32, typically used in the prior art, may include an electro-mechanical contactor or motor starter (not shown) that may be configured to be controlled by a speed timer 4, that may be located at pivot point 2, using a speed timer 4 base percent speed timer-setting 3, 5 (FIGS. 2A and 2B) to cycle span motor 38 of outermost drive tower 32 on-and-off. This repeated on-and-off control cycling of the span motor 38 of the drive assembly 34 of outermost drive tower 32 determines the average speed for the roving center pivot arm assembly 10. In other words, the speed of the roving center pivot arm assembly 10 is determined by the movement of outermost drive tower 32 using a span motor 38 variably controlled in an on-and-off manner by a speed timer 4 (FIGS. 2A, 2B and 4A). It should be understood that the terms "average speed" and "speed" are used interchangeably in the present disclosure to denote the average, or effective speed of the roving center pivot arm assembly over an extended period of time.

Typically, the speed timer 4 may be configured to control span motor 38 of outermost fixed-speed drive assembly 34 of outermost drive tower 32 to a running status, e.g., using base percent speed timer-setting 3, 5 configured as a percentage of a one-minute cycle. Referring to the table of values in FIG. 6, the speed timer 4 base percent speed timer-setting 5 (FIG. 2B) provides a 10% speed of movement that is achieved by adjusting the relative proportion of on-and-off time of the span motor 38 to 6-seconds on (10% of 60-seconds) and 54-seconds off for each one minute cycle of speed timer 4.

In another example of the prior art, FIG. 2A illustrates a speed timer 4 base percent speed timer-setting 3 of 50%. This results in the span motor 38 of the outermost fixed-speed drive assembly 34 of drive tower 32 cycling span motor 38 on for 50% of 60-seconds, i.e., for 30-seconds, and cycling off for the remainder of the one-minute cycle.

When said speed timer 4, using base percent speed timer-setting 3, 5, cycles span motor 38 on (for any base percent speed timer-setting 3, 5) the span motor 38 operates at a fixed speed, typically 1,760 RPM. The speed timer 4, using base percent speed timer-setting 3, 5, simply controls the speed of movement by adjusting the relative proportion of on-and-off time specified by the speed timer 4 base percent speed timer-setting 3, 5 controlling span motor 38.

FIG. 3C is a line chart of an example of a water application of 1-inch of gross inches applied 63 over a 24-hour irrigation cycle starting at midnight. Typically, the gross inches applied 63 may be unchanged (i.e., the speed timer 4 base percent speed timer-setting 3, 5 may be unchanged) throughout the 24-hour period. The data plotted for the gross inches applied 63 shows an equal amount of irrigation applied (in an example, 1-inch) for all consecutive time periods 59 (FIG. 6) of the irrigation cycle. However, the net inches available to the crop 66 (FIG. 3C) indicates a loss of a portion of the gross inches applied 63 due to the dynamic effects of WDEL over a 24-hour period.

With reference to FIG. 3C, for the prior art, the difference between the gross inches applied 63 and the net inches available to the crop 66 illustrates the amount and timing of water lost to WDEL in a 24-hour irrigation cycle. Beginning at midnight, FIG. 3C illustrates a typical 24-hour irrigation cycle that would be reasonably representative of the effects of WDEL on a gross inches applied 63 resulting in net inches available to a crop 66 on any average day during the irrigation season. Throughout the irrigation season, the effects of WDEL on a field 6 may be reasonably determined from readily available irrigation research data, documenting the effects of WDEL, hour-by-hour, based on geographic location and current date and local time of day 60 (FIGS. 5 and 6).

The typical operation of a center pivot irrigation system 1 of the prior art (FIG. 1) is to use the speed timer 4 to set a base percent speed timer-setting 3, 5 (FIGS. 2A and 2B). In typical irrigation practices by irrigators, the selected base percent speed timer-setting 3, 5 is typically not changed based on a time of day. Rather the speed of the roving center pivot arm assembly 10, once speed timer 4 is set to a base percent speed timer-setting 3,5, delivers a uniform gross inches applied 63 (FIGS. 3C and 5) to the entire field 6 (FIG. 3A), regardless of the effects of WDEL to a field 6 (FIG. 3A).

Example Implementations of the Present Invention.

Figure 4B:
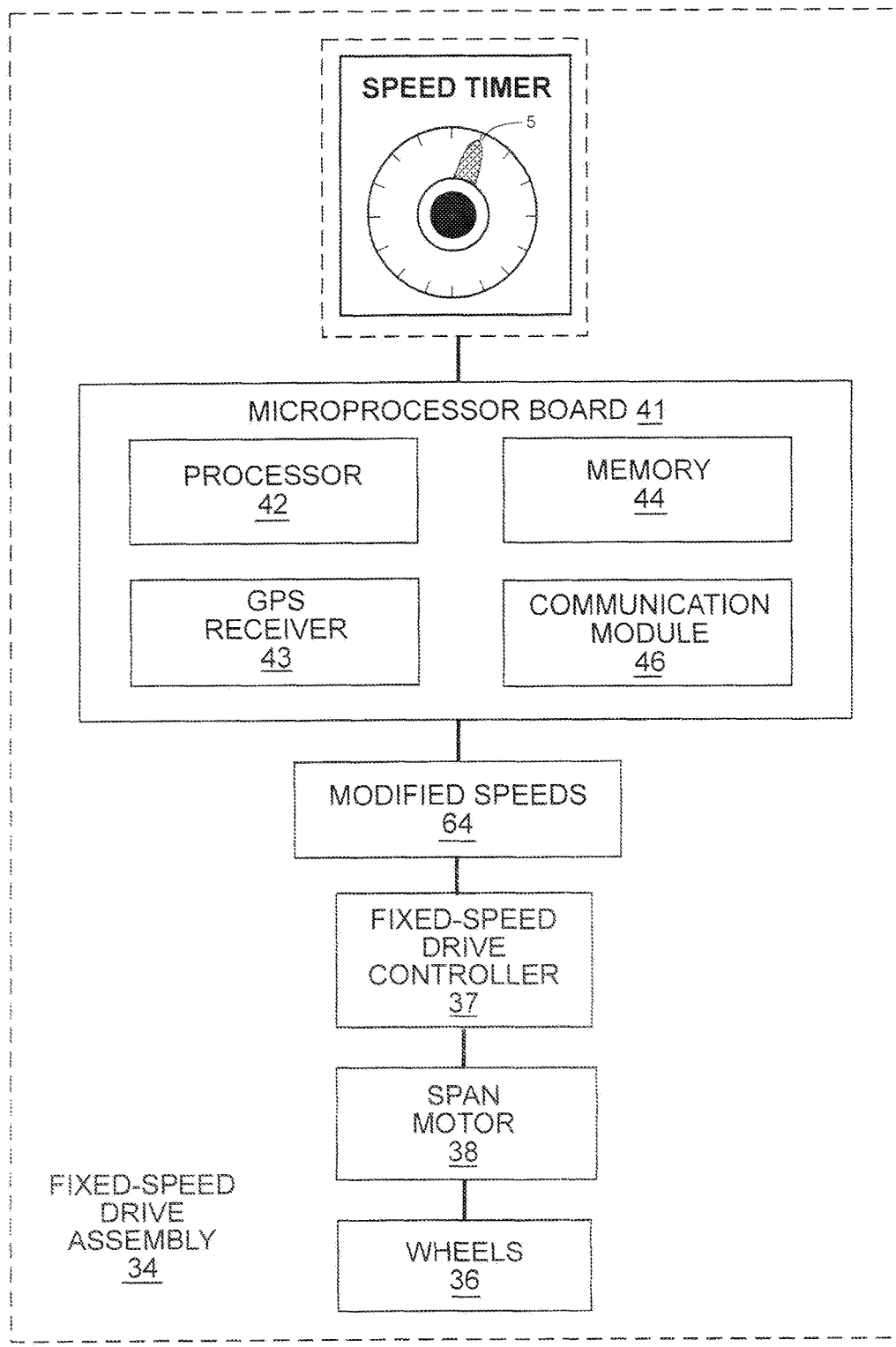
FIG. 4B is an illustration of the fixed-speed drive assembly of the present invention incorporating a microprocessor board between the speed timer and the fixed-speed drive controller.

FIG. 4B illustrates a method of the present invention using a microprocessor board 41 configured to monitor the output of speed timer 4 to determine the speed timer 4 base percent speed timer-setting 5, and, in turn, to output a modified speed 64 to fixed-speed drive controller 37 that variably controls the on-and-off cycle of span motor 38 driving wheels 36 of fixed-speed drive assembly 34 of outermost drive tower 32 (FIG. 1) of center pivot irrigation system 1.

Referring to FIGS. 4B and 6, a speed timer 4 may, in an example, be set to a base percent speed timer-setting 5 (e.g., 10%). Such a base percent speed timer-setting 5 may result in span motor 38 being controlled on for 6-seconds and off for 54-seconds in each consecutive one-minute cycle. Using the base percent speed timer-setting 5 output by speed timer 4, in an example, processor 42 of microprocessor board 41 is configured to measure the corresponding on-and-off cycle times of speed timer 4 in seconds and, thereby, determine the base percent speed timer-setting 5 (10% base percent speed timer-setting in the example). In addition, processor 42 may be configured to access and use local time of day 60 provided conventionally by GPS receiver 43 to select from memory 44 the corresponding speed modifier values 61 stored in memory 44 for a local time of day 60. In turn, processor 42 may factor the percent timer base percent speed timer-setting 5 (determined to be 10% in the example) by the speed modifier value 61 that corresponds to the local time of day 60 of consecutive time periods 59. Such consecutive time periods 59 may be determined from a corresponding local time of day 60 as provided by GPS receiver 43 of microprocessor board 41 (or by other conventional means of time keeping).

It should be noted that those familiar with the art will understand that the configuration of a microprocessor board 41 as shown in FIG. 4B may only be one example of a configuration of the microprocessor board 41. Other configurations may include a programmable main panel (not shown) with processing capability similar to the above-described configuration built into said main panel. Likewise, the functionality of the microprocessor board 41 described above could be included in a remote telemetry system with a central processor providing similar functions to that of a programmable main panel.

In all cases this process results in a modification to the speed timer 4 base percent speed timer-setting 5 for each time period 59 that, in general, slows the relative speed of the roving center pivot arm assembly 10 during daytime hours and speeds up during nighttime hours.

Figure 7:
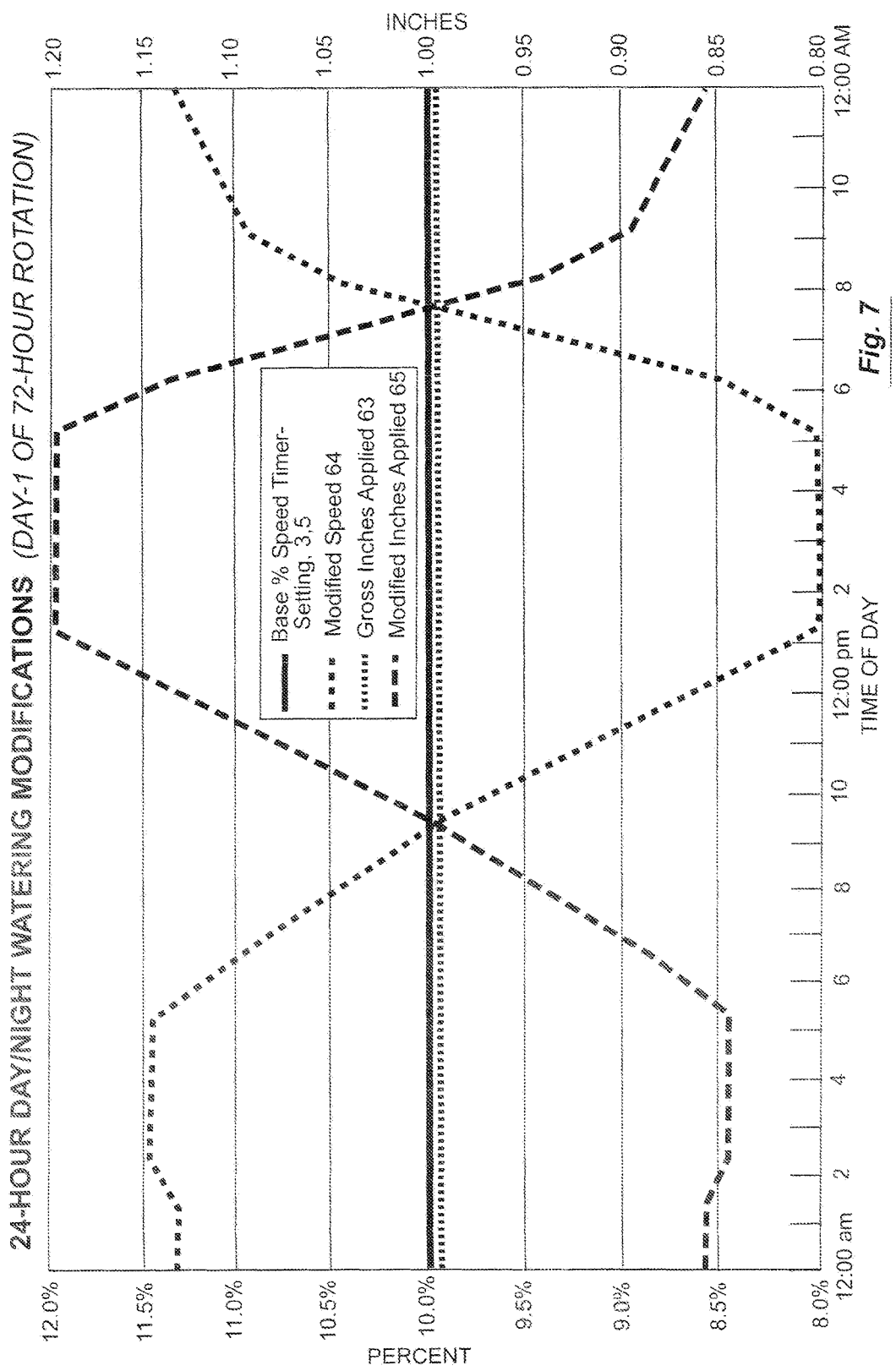
FIG. 7 is a chart of the present invention illustrating a plurality of changes to the speed timer base percent speed timer-setting to create modified speeds of a center pivot irrigation system resulting in modified inches applied from a gross inches applied within a given 24-hour irrigation cycle.

FIG. 7 is a line chart illustrating the changes to the base percent speed timer-setting 3, 5 made over consecutive time periods 59, configured to be one-hour increments of time. Referring to day/night modifier table 48 in FIG. 6, the modified speeds 64 may result from factoring the base percent speed timer-setting 3, 5 (determined to be 10% in the example) by speed modifier values 61 for each consecutive time period 59, resulting in modified speeds 64. The modified speeds 64 adjust the speed of the roving center pivot arm assembly 10. In turn, FIG. 7 also illustrates the changes to the gross inches applied 63 to result in the modified inches applied 65, based on a corresponding local time of day 60 for each corresponding time period 59.

Figure 9B:
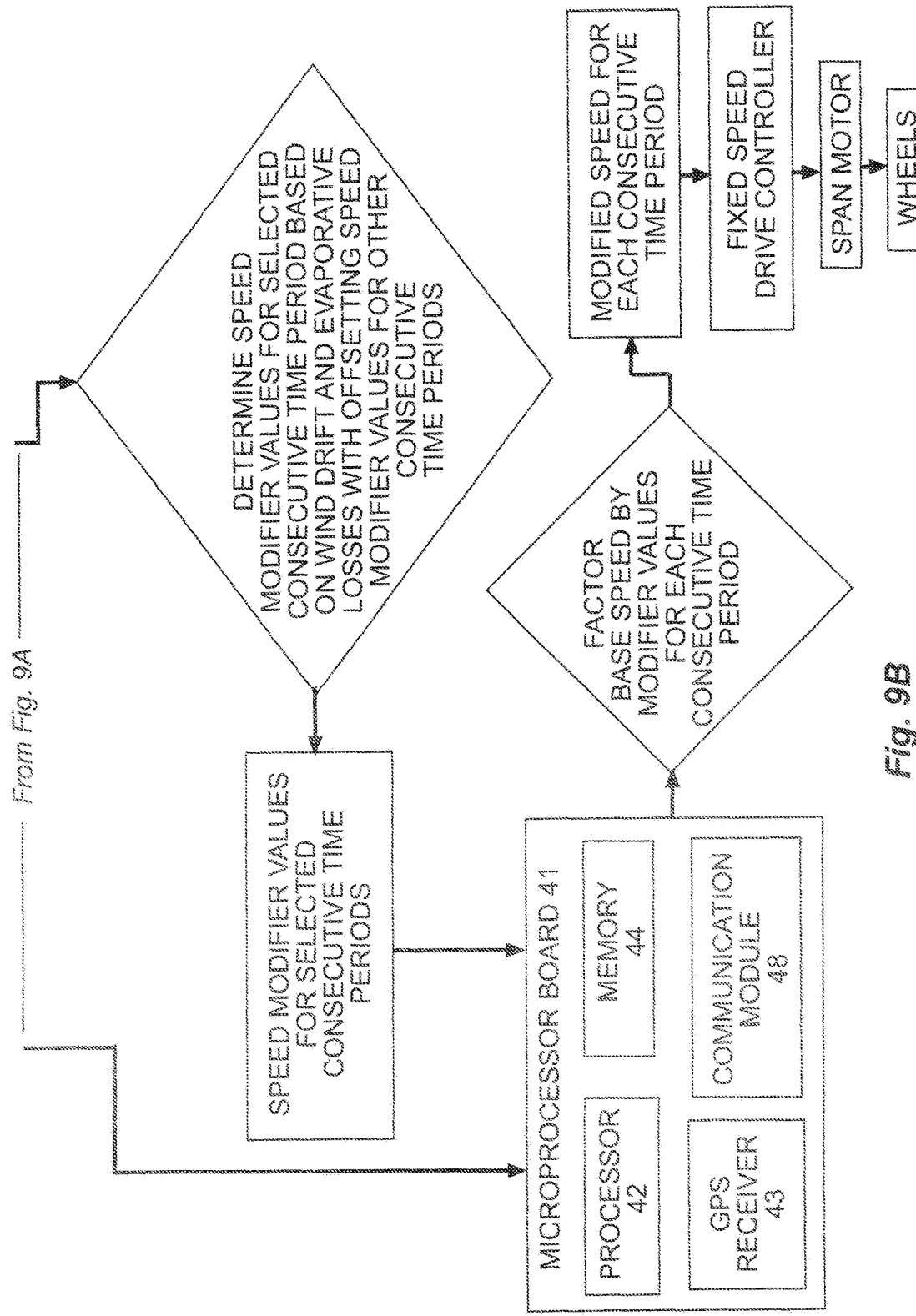

FIGS. 9A and 9B are a flow diagram illustrating the process used by a method of the present invention to output a modified speed 64 for each corresponding time period 59 to offset the effects of WDEL on irrigation efficiency during a 24-hour irrigation cycle. This process assumes that an irrigator conventionally determines a period of time for completing an irrigation cycle. In turn, the irrigator may adjust a speed timer 4 to a base percent speed timer-setting 3, 5 corresponding to the predetermined period of time for completing an irrigation cycle.

With reference to FIGS. 9A and 9B, for the method of the present invention, the predetermined period of time for completing an irrigation cycle is divided into a plurality of consecutive time periods 59. Using conventional, time based data on WDEL for the general location of center pivot irrigation system 1, speed modifier values 61 are determined for selected consecutive time periods 59, with offsetting speed modifier values 61 for other consecutive time periods 59.

A microprocessor board 41 may be configured to store in memory 44 the speed modifier values 61 determined for each consecutive time period 59, based on the effects of WDEL on irrigation efficiency for selected consecutive time periods 59 and on offsetting speed modifier values 61 for other consecutive time periods 59.

The processor 42 of the microprocessor board 41 may be configured to continuously determine the speed timer 4 base percent speed timer-setting 3,5, conventionally configured to control the on-and-off cycle of span motor 38. The determined speed timer 4 base percent speed timer-setting 3,5 may, in turn, be factored by processor 42, using speed modifier values 61 stored in memory 44, to create modified speeds 64 for each consecutive time period 59. In turn, such modified speeds 64 for each consecutive time period 59 may be output by the microprocessor board 41 to a fixed speed drive controller 37 based on a local time of day 60 continuously provided by GPS receiver 43 or other conventional time keeping means. The modified speeds 64 output by microprocessor board 41 to fixed-speed drive controller 37, using communication module 46, variably control the speed of the roving center pivot arm assembly 10 of center pivot irrigation system 1. Such modified speeds 64 to control the speed may be output, hour-by-hour in the example, using corresponding consecutive time periods 59.

The microprocessor board may also include a conventional GPS receiver that may be configured to continuously provide processor 42 with a local time of day 60 and to determine the location of the center pivot irrigation system 1 based on conventional GPS coordinate data. Processor 42 may use corresponding speed modifier values 61 stored in memory 44 to factor a determined base percent timer speed setting 3, 5 to thereby create a modified speed 64 corresponding to a consecutive time period 59 for a local time of day 60 for the location of a field 6. Such local time of day 60 may be provided continuously by GPS receiver 43 to processor 42 using GMT data and location coordinate data (latitude and longitude), available in real time from GPS receiver 43, to determine local time of day 60.

Finally, with reference to FIGS. 4B, 9A and 9B, using communication module 46 of microprocessor board 41, the modified speed 64 may be communicated to fixed-speed drive controller 37. The fixed-speed drive controller 37 may, in turn, variably control the on-and-off cycle times of span motor 38, driving wheels 36 of fixed-speed drive assembly 34, to modify the speed of the roving center pivot arm assembly 10 of center pivot irrigation system 1.

For a detailed example of a modification of a base percent speed timer-setting 3, 5 for a single consecutive time period 59, refer to FIG. 6, day/night modifier table 48, and assume a percent timer 4 base percent speed timer-setting 5 (i.e., 10%). Assume also the single consecutive time period 59 selected in the example is local time of day 60 occurring between the hours of 1:00 PM and 2:00 PM (reference consecutive time period 59, line 14). The corresponding speed modifier value 61 (for line 14) is 0.80. Applying this speed modifier value 61 of 0.80 for line 14 to the base percent speed timer-setting 5 of 10% may, in this example, result in a modified speed 64 for line 14 of 8.0% (10%× 0.80=8%).

The effect of this process, as detailed in the flow diagram illustrated in FIGS. 9A and 9B, may be to slow the speed during a selected one-hour duration of time period 60, line 14 (between the hours of 1:00 PM and 2:00 PM) by modifying the on-time seconds of span motor 38 from 6.0-seconds (10% of 60 seconds) to 4.8-seconds (8% of 60 seconds). This modification to the on-time seconds of span motor 38 for a one-minute speed timer cycle, in turn, slows the speed and increases the 1.00-inch gross inches applied 63 to a modified inches applied 65 of 1.20 inches for line 14. The increase from 1.0-inches to 1.20-inches provides additional irrigation water to offset the effects of WDEL on irrigation efficiency for the time period 59, line 14 (i.e., for the 1:00 PM hour).

This method of the present invention also includes offsetting the modified inches applied 65, in the example 1.20-inches, at other time periods 59. For example, in time period 59, line 3, for local time of day 60 for the 2:00 AM hour, the modified inches applied 65 are decreased from 1.0-inch to 0.85-inch. The aggregate of all modified inches applied 65 for any 24-hour period of consecutive time periods 59 may result in no cumulative change to the gross inches applied 63, in this example, 1.0-inch.

Referring to the 24-hour averages at the bottom of FIG. 6, it is important to note that for the above method of the present invention, the plurality of twenty-four speed modifier values 61 aggregate to a sum of 1.00 in a 24-hour period. Similarly, the aggregate of the total value of the modified speeds 64 sum to a total of 10%, the same percent as the base percent speed timer-setting 5. In addition, the aggregate of the modified inches applied 65 values totals to 1.00 inches, the same as the gross inches applied 63 of 1.00 inches.

This process of varying the hour-by-hour speed of the roving center pivot arm assembly 10 corrects for the dynamic effects of WDEL on irrigation efficiency, but maintains the same distance of travel for the roving center pivot arm assembly 10 over a field 6 in any irrigation time cycle (e.g., a 24-hour period). The result is no disruption to the irrigation schedule as otherwise implemented by an irrigator. The hour-by-hour modifications to the gross inches applied 63 from a fixed, speed timer 4 base percent speed timer-setting 3, 5 may not be disruptive to the irrigation process because the elapsed time for an irrigation pass (rotation) may not be changed using this method of the present invention.

An added feature that may be included in the present invention is to configure the processor 42 of microprocessor 41 to ignore using speed modifier values 61 to make modifications to percent timer 4 base percent timer speed-settings 3, 5 determined, in an example, to be less than 6.0% or greater than 50%. This is practical in application because most speed timer 4 devices may not be capable of consistently and accurately executing base percent speed timer-settings 3, 5 of less than 5%. For base percent speed timer-settings 3, 5 above 50% the intended operation of the center pivot irrigation system may more typically include the application of chemicals injected into a water supply; and modifying such higher speed water applications may not be suitable to the intended chemigation process. Therefore, the methods of the present invention may provide for the setting of a range of acceptable base percent speed timer-settings 3, 5 between, for example, 6% to 50%. Base percent speed timer-settings 3, 5 outside of such a range may not be suitable for factoring by speed modifier values 61, and processor 42 may be configured to ignore applying speed modifier values 61 to factor base percent speed timer-settings 3, 5 falling within the defined range.

In another embodiment of the present invention, the method of using a microprocessor board 41 to monitor the output of speed timer 4 to determine the base percent speed timer-setting 5 may not be required. Rather, a predetermined base speed of movement for the roving center pivot arm assembly 10 may simply be provided to a microprocessor board 41 in the form of a percentage value (e.g., 10%). This predetermined base speed of movement may be provided from a conventional programmable main panel, remote telemetry system or other means conventionally used to control the movement of center pivot irrigation systems 1. The control methods of programmable main panels, remote telemetry systems, and the like, may each be capable of storing a plurality of base speeds of movement for use in controlling the speed of movement of the roving center pivot arm assembly 10 based on local time of day 60, on the position of the roving center pivot arm assembly 10 in degrees, and on other criteria.

Figure 8A:
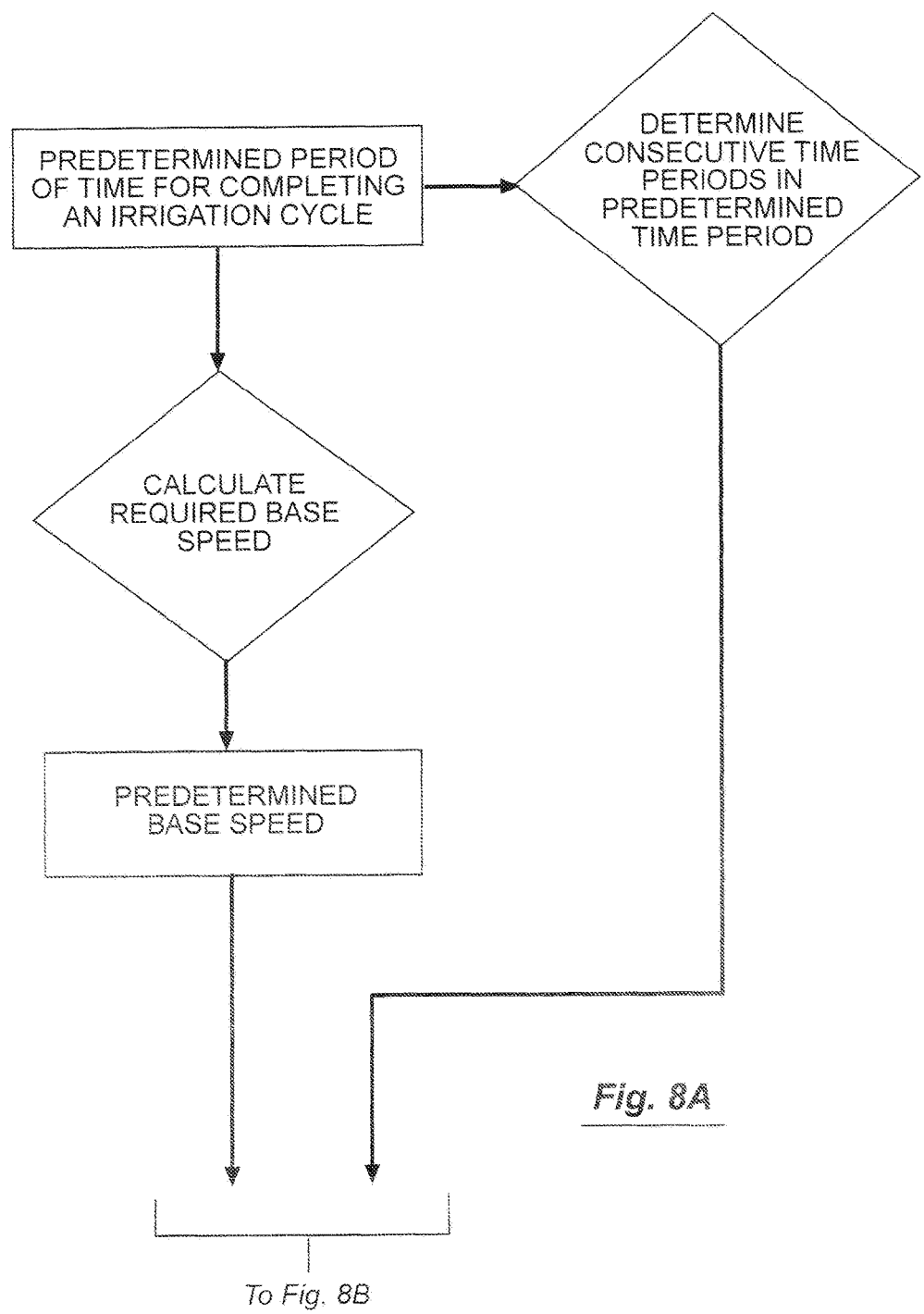
FIGS. 8A and 8B are a flow diagram of the process used by the present invention as put forth in claim 1.
Figure 8B:
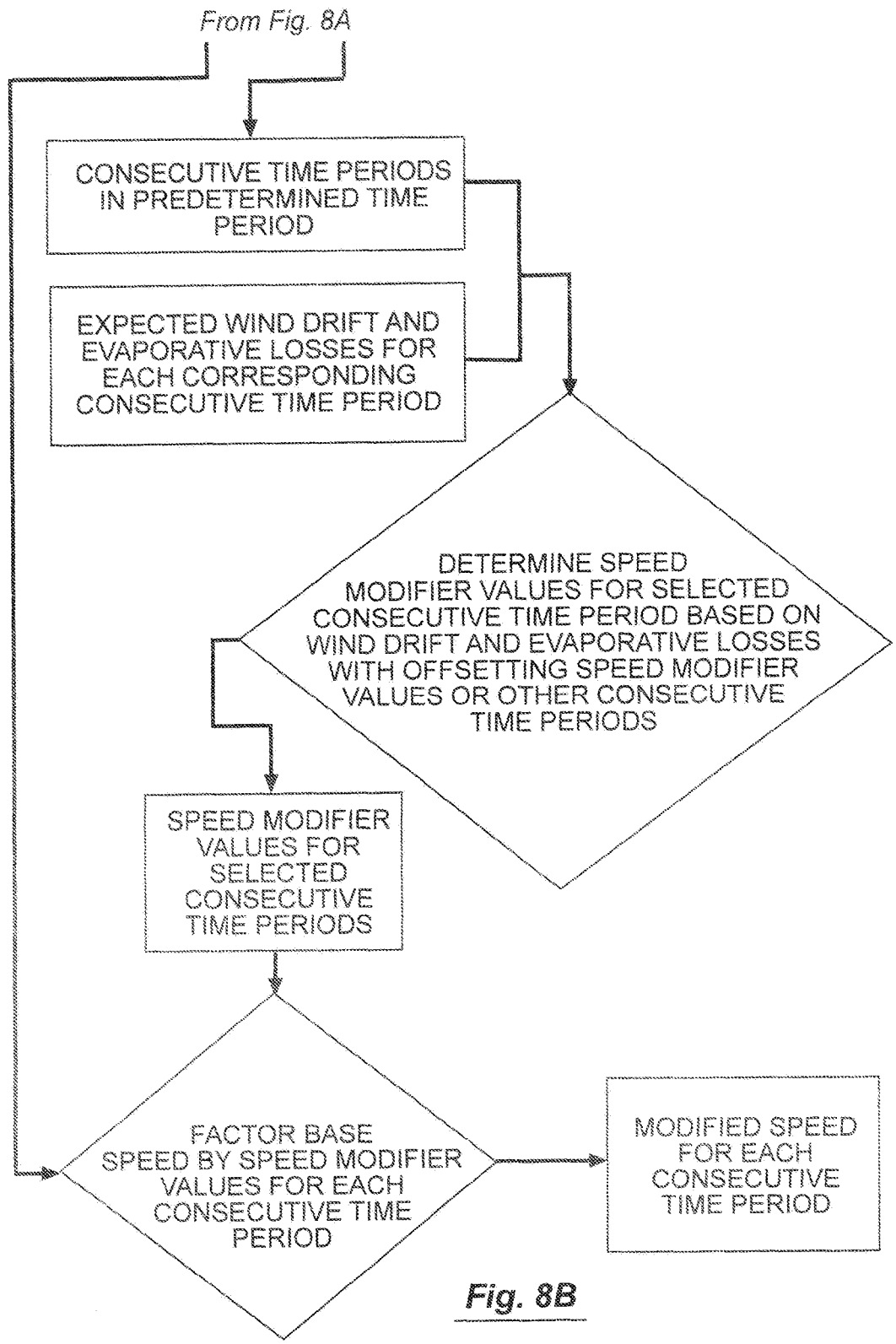

FIGS. 8A and 8B illustrate a flow diagram wherein processor 42 of microprocessor board 41 may be provided a current, predetermined base speed of movement, in-lieu-of having to determine such base speed of movement by measuring the on-and-off cycle time of a speed timer 4. In this second embodiment of the present invention, the output of modified speeds 64 by microprocessor board 41 using communications module 46 may be identical to the processes illustrated in FIGS. 9A and 9B, above, with the exception of determining the base percent speed timer-setting 3, 5 by measuring the relative on-and-off seconds of a speed timer 4.

Since application of the methods of the present invention do not change the total distance of travel of the roving center pivot arm assembly 10 in a given 24-hour irrigation cycle (averages at bottom of FIG. 6), the improvements to overall irrigation efficiency may be realized without disruption to the irrigator's irrigation schedule.

The modified speeds 64 as embodied by the present invention may result in significant improvements to overall irrigation efficiency on any center pivot irrigation system 1. Selected application of speed modifier values 61 to the base percent speed timer-setting 3,5 generally decreases speed, to increase modified inches applied 65 (application depth of irrigation water) during daytime hours that are typically the hottest and windiest times of the 24-hour irrigation cycle (FIG. 7). To equally offset such modified speeds 64 output by the microprocessor board 41 during selected consecutive time periods 59, the methods of the present invention may decrease modified inches applied 65 during nighttime hours, thereby, decreasing application depth of water during the coolest and calmest times of the 24-hour irrigation cycle (FIG. 7).

If the plurality of these speed modifier values 61 applied to the base percent speed timer-setting 3, 5 during consecutive time periods 59 (i.e., between daytime and nighttime hours) are not properly offset, the distance of travel by the roving center pivot arm assembly 10 in a given 24-hour irrigation cycle, using methods of the present invention, will not coincide with the distance of travel as predicted by the base percent speed timer-setting 3, 5 without applying said speed modifier values 61. Such a disruption to the irrigator's irrigation schedule may be problematic to the process of effectively managing timely irrigations, and such disruption to the irrigator's irrigation schedule may otherwise impede adoption of the general methods of the present invention.

In general, aspects of the disclosure are suitable for use on any center pivot irrigation system 1, but may also be utilized on other types of irrigation systems, such as a lateral movement type.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for controlling the operation of an irrigation system having a pivot arm assembly with a predetermined period of time for completing an irrigation cycle at a predetermined base speed, said method comprising:
   dividing the predetermined period of time for completing an irrigation cycle into a plurality of consecutive time periods;
   determining expected wind drift and evaporative losses for each corresponding time period;
   determining offsetting speed modifier values to increase the base speed for the pivot arm assembly for selected time periods and decrease the base speed for the pivot arm assembly for other selected time periods based on the corresponding expected wind drift and evaporative losses, wherein the speed modifier values are determined so as to maintain unchanged the period of time for completing an irrigation cycle; and
   controlling operation of the pivot arm assembly to move at the corresponding modified speed for each time period.

2. The method of claim 1 wherein the base speed is determined by a speed timer variably controlling the base speed of the pivot arm assembly, and wherein the modified speed for each time period is determined by multiplying the base speed by the speed modifier value for that time period.

3. The method of claim 1 wherein the step of determining the expected wind drift and evaporative losses for selected time periods is based on weather forecast data for the location of the irrigation system.

4. The method of claim 1 wherein the step of determining the expected wind drift and evaporative losses for selected time periods is based on historical weather data for the location of the irrigation system.

5. The method of claim 1 wherein the step of determining the expected wind drift and evaporative losses for selected time periods is based on real-time data from local weather data sensors for the location of the irrigation system.

6. The method of claim 1 wherein the irrigation system further comprises a global positioning system (GPS) receiver to determine the location, current date and local time of day of the irrigation system.

7. The method of claim 1 wherein the pivot arm assembly is driven by a span motor variably controlled in an on-and-off manner, and the modified speed for each time period is achieved by modifying the relative proportion of on-and-off time of the span motor.

8. The method of claim 1 wherein the step of controlling operation of the pivot arm assembly further comprises ignoring speed modifier values outside a predetermined range of speeds for the pivot arm assembly.

9. A method for controlling the operation of an irrigation system having a pivot arm assembly and a speed timer variably controlling the pivot arm assembly in an on-and-off manner to maintain a base speed to complete an irrigation cycle in the predetermined period of time; said method comprising:
   dividing the predetermined period of time for completing an irrigation cycle into a plurality of consecutive time periods;
   determining expected wind drift and evaporative losses for each time period over the irrigation cycle;
   determining offsetting speed modifier values to increase the base speed for the pivot arm assembly for selected time periods and decrease the base speed for the pivot arm assembly for other selected time periods based on the expected wind drift and evaporative losses, wherein the speed modifier values are determined so as to maintain unchanged the period of time for completing an irrigation cycle; and
   controlling operation of the pivot arm assembly to move at modified speeds for each time period over the irrigation cycle, by applying the speed modifier value for each time period to adjust the relative proportion of on-and-off time specified by the speed timer.

10. The method of claim 9 wherein the modified speed for each time period is determined by multiplying the base speed set by the speed timer by the speed modifier value for each time period.

11. The method of claim 9 wherein the step of determining the expected wind drift and evaporative losses for selected time periods is based on weather forecast data for the location of the irrigation system.

12. The method of claim 9 wherein the step of determining the expected wind drift and evaporative losses for selected time periods is based on real-time data from local weather data sensors for the location of the irrigation system.

13. The method of claim 9 wherein the step of determining the expected wind drift and evaporative losses for selected time periods is based on historical weather data for the location of the irrigation system.

14. The method of claim 9 wherein the center pivot irrigation system further includes a global positioning system (GPS) receiver to determine the location, current date and local time of day of the irrigation system.

15. The method of claim 9 wherein the step of controlling operation of the pivot arm assembly further comprises ignoring speed modifier values outside a predetermined range of speeds for the pivot arm assembly.

* * * * *